(12) United States Patent
Nieuwkerk et al.

(10) Patent No.: US 7,903,335 B2
(45) Date of Patent: Mar. 8, 2011

(54) MIRROR WITH BUILT-IN DISPLAY

(75) Inventors: Armanda Cinderella Nieuwkerk, Eindhoven (NL); Emiel Peeters, Eindhoven (NL); Hugo Johan Cornelissen, Eindhoven (NL); Martinus Hermanus Wilhelmus Maria Van Delden, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 302 days.

(21) Appl. No.: 10/578,448

(22) PCT Filed: Nov. 3, 2004

(86) PCT No.: PCT/IB2004/052280
§ 371 (c)(1),
(2), (4) Date: May 8, 2006

(87) PCT Pub. No.: WO2005/045481
PCT Pub. Date: May 19, 2005

(65) Prior Publication Data
US 2007/0041096 A1    Feb. 22, 2007

(30) Foreign Application Priority Data
Nov. 11, 2003    (EP) .................................... 03104146

(51) Int. Cl.
*G02B 5/30* (2006.01)
*G02B 27/28* (2006.01)

(52) U.S. Cl. ........................ 359/502; 359/495; 359/501
(58) Field of Classification Search .................. 359/495, 359/501, 502
See application file for complete search history.

(56) References Cited

U.S. PATENT DOCUMENTS

| 7,015,991 B2 * | 3/2006 | Conner et al. ................ 349/106 |
| 2002/0080494 A1 | 6/2002 | Meine |
| 2004/0036672 A1 * | 2/2004 | Yoo et al. ...................... 345/102 |
| 2004/0100598 A1 | 5/2004 | Adachi et al. |
| 2004/0223099 A1 * | 11/2004 | Kotchick et al. ............. 349/114 |
| 2006/0279547 A1 | 12/2006 | Karman et al. |
| 2006/0279680 A1 | 12/2006 | Karman et al. |
| 2007/0040778 A1 | 2/2007 | Karman et al. |
| 2007/0052699 A1 | 3/2007 | Karman et al. |

FOREIGN PATENT DOCUMENTS

| DE | 10104645 A1 | 10/2002 |
| HU | 216046 B | 2/1992 |
| HU | 63503 A2 | 8/1993 |
| JP | 2001318374 A | 11/2001 |
| JP | 2003241175 A | 8/2003 |
| WO | 03079318 A1 | 9/2003 |
| WO | WO 03/079318 | * 9/2003 |

* cited by examiner

*Primary Examiner* — Joshua L Pritchett

(57) ABSTRACT

A mirror device which can be simultaneously used for display purposes, based on e.g. an LCD display with a polarizing mirror placed in front of it. The reflectivity of such a mirror display is enhanced by providing at its non-viewing side a further polarizing mirror Color absorption in the display is prevented by placing the color filter or a color (sequential) backlight behind this reflective polarizer at the back of the display.

14 Claims, 4 Drawing Sheets

MIRROR WITH BUILT-IN DISPLAY

Figure 1:
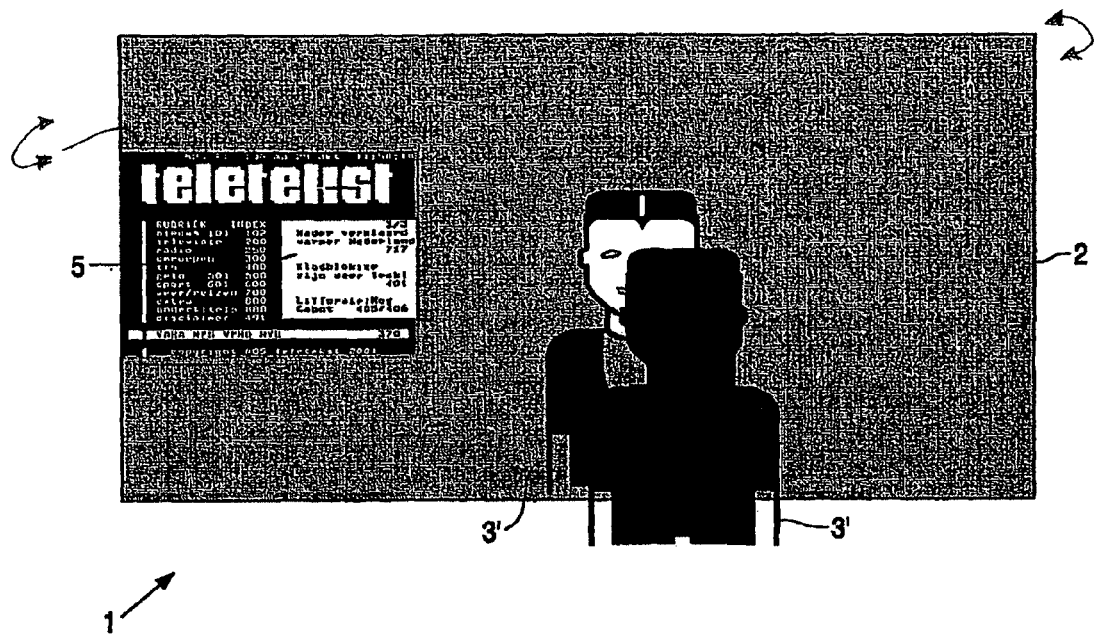

The invention relates to a polarizing mirror for viewing purposes having a first plane reflecting light of a first kind of polarization to a viewing side, the mirror passing light of a second kind of polarization and being provided with a display device at its non-viewing side, which display device during use provides light of the second kind of polarization. A "mirror for viewing purposes" or "display mirror" in this application refers to a mirror, via which a person's eye (or an artificial eye like a (infra-red) camera lens) sees a reflected part of the outside world. As examples one may think of large mirrors, like bathroom mirrors, full-length mirrors in fitting rooms or even mirrored walls. Other examples are medium sized mirrors, like outside mirrors for trucks or dressing-table mirrors.

By "having a first plane reflecting light of a first kind of polarization" it is meant that a mirror plane acts as a polarizing plane. When in use, light within a certain range of a wavelength of light incident on a polarizing plane will be divided in two components one which is reflected by the polarizing plane and one of which passes through the polarizing plane. Generally most known is the division of light in two components having linearly polarized, perpendicular directions of polarization. On the other hand the light may be divided in right-handed and left-handed circular or elliptical polarization.

A display mirror of the kind mentioned above is described in the pending European Applications Serial number 02076069.2, filed on Mar. 18, 2002 and Serial number 02079306.3, filed on Oct. 17, 2002 (=PH NL 02.1038). The mirror function is obtained by introducing a polarizing mirror or reflective polarizer instead of a partly reflecting layer in front of a display device.

In general practice the reflectivity of such mirrors is chosen to be optimal, i.e. as high as possible. As a consequence preferably substantially all light, or as much light as possible should be reflected for optimal functioning. Such a mirror reflects light of a first kind of polarization to a viewing side and passes light of a second kind of polarization, but moreover is provided with a display device at its non-viewing side, which display device during use provides light of the second kind of polarization.

The display device during use emits or reflects (polarized) light.

By adapting the polarization (direction) of the light of the second kind of polarization to polarization (direction) of the polarized light emitted by the display a transmission factor of substantially 100% is achieved, resulting in a high contrast of displayed information with respect to reflected images.

However, especially when part of the mirror is used as a display, the mirror function remains active in the other (display) part of the mirror plane. The resulting reflections cause a deterioration of the daylight visibility and contrast. On the other hand when used as a mirror, only one polarization component is reflected so the reflectivity is only approximately 50%. Ideally a display mirror should be 100% transparent in the display mode and 100% reflective in the mirror mode.

The present invention has as one of its goals to overcome these problems at least partially by enhancing the reflectivity of such a mirror display.

To this end a polarizing mirror according to the invention has at its non-viewing side a further polarizing mirror.

In this configuration the transmission of the mirror display can again be switched between 0 and 100%, whereas the reflection is enhanced to about 62.5% (depending on the transmission losses due to a color filter which is assumed to be approximately 16%). So for the reflective state an enhancement of the reflectivity can be obtained.

In a preferred embodiment the further polarizing mirror is provided between an electro-optical layer of the display device and color generating means. In this way the transmission losses due to color filters are eliminated and the reflection is enhanced to about 85%. The color filter is now placed behind the further polarizing mirror. Similar effects are obtained with other color generating means such as a color sequential backlight.

The display mirror as proposed in the display mode still has 50% reflectivity (for white pixels) and (for black pixels) it can even increase to 85%. To suppress this reflectivity the polarizing mirror at its viewing side preferably is provided with polarizing means being switchable between two optical states.

In one embodiment the polarizing mirror at its viewing side comprises between two substrates a liquid crystal layer comprising a dye.

In another embodiment the polarizing mirror at its viewing side comprises a switchable ½λ retarder and a polarizer. Use of such a switchable polarizer is also favorable between the display device and the further polarizing mirror for further suppressing of reflections.

These and other aspects of the invention are apparent from and will be elucidated with reference to the embodiments described hereinafter.

Figure 2:
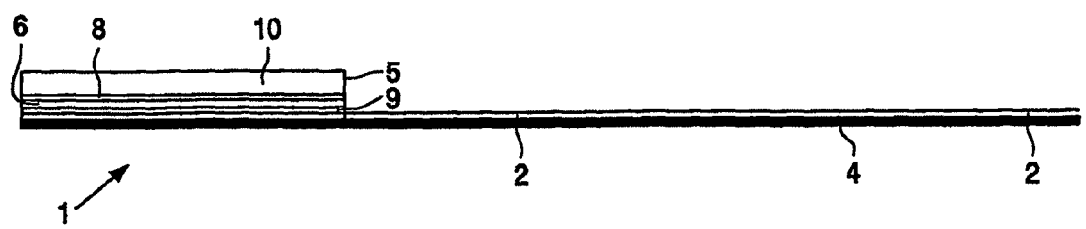

In the drawings:

FIG. 1 is a possible embodiment of a mirror device according to the invention, while FIG. 2 is a diagrammatic cross-section of a part of such a mirror device.

Figure 3:
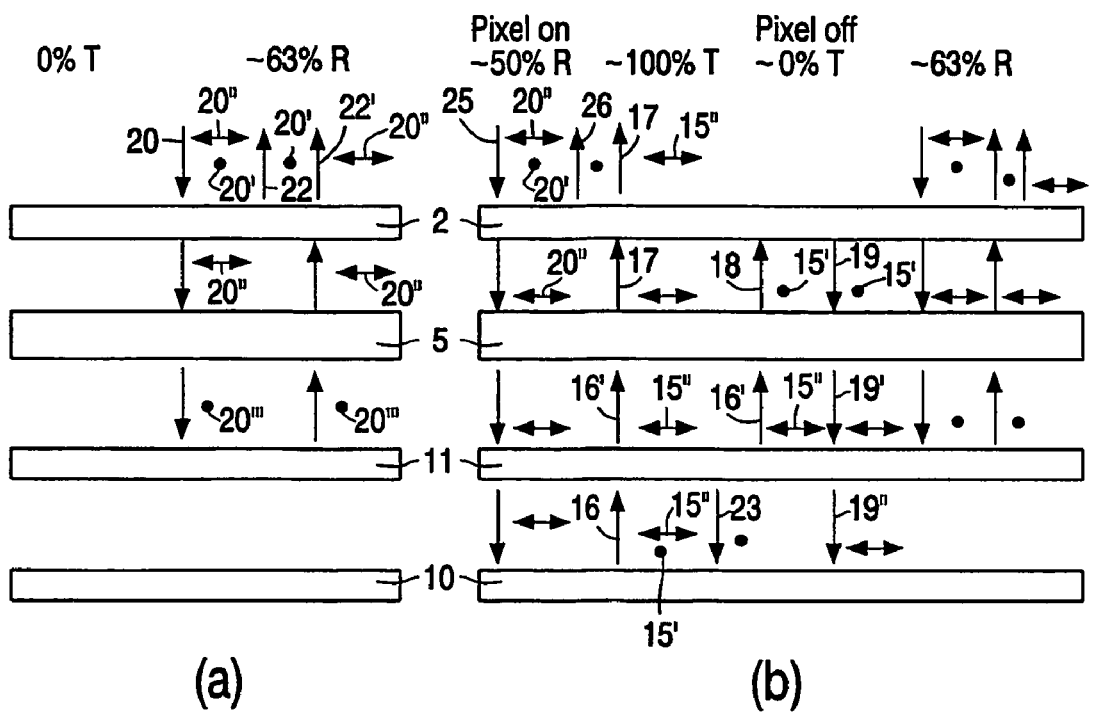
Figure 4:
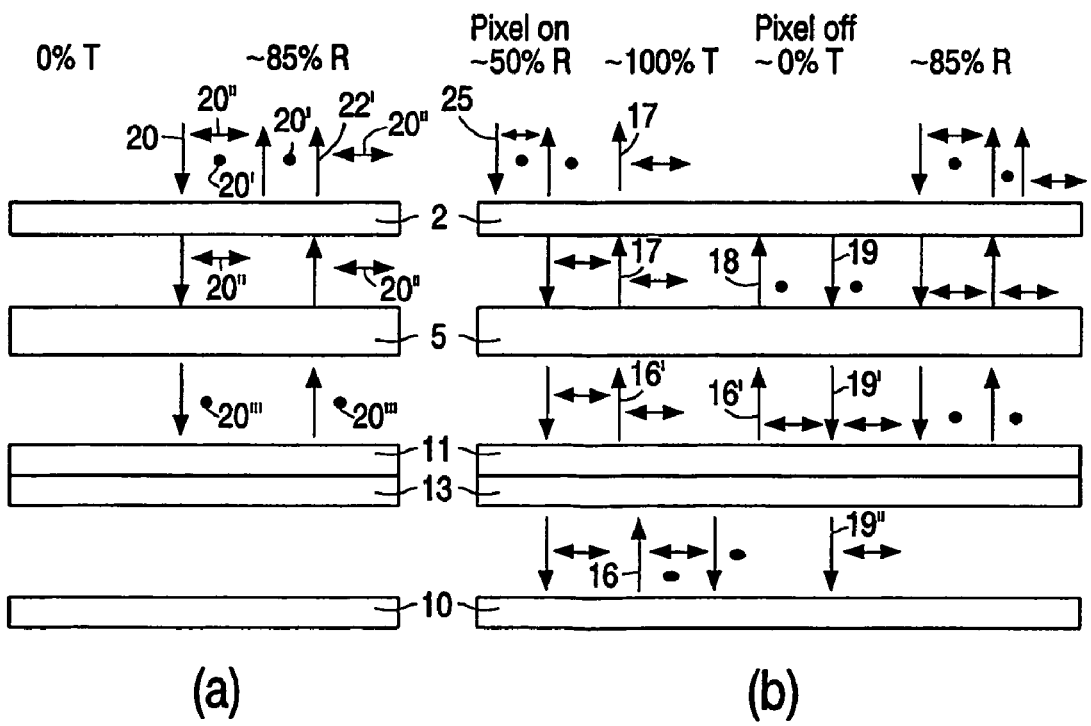
Figure 5:
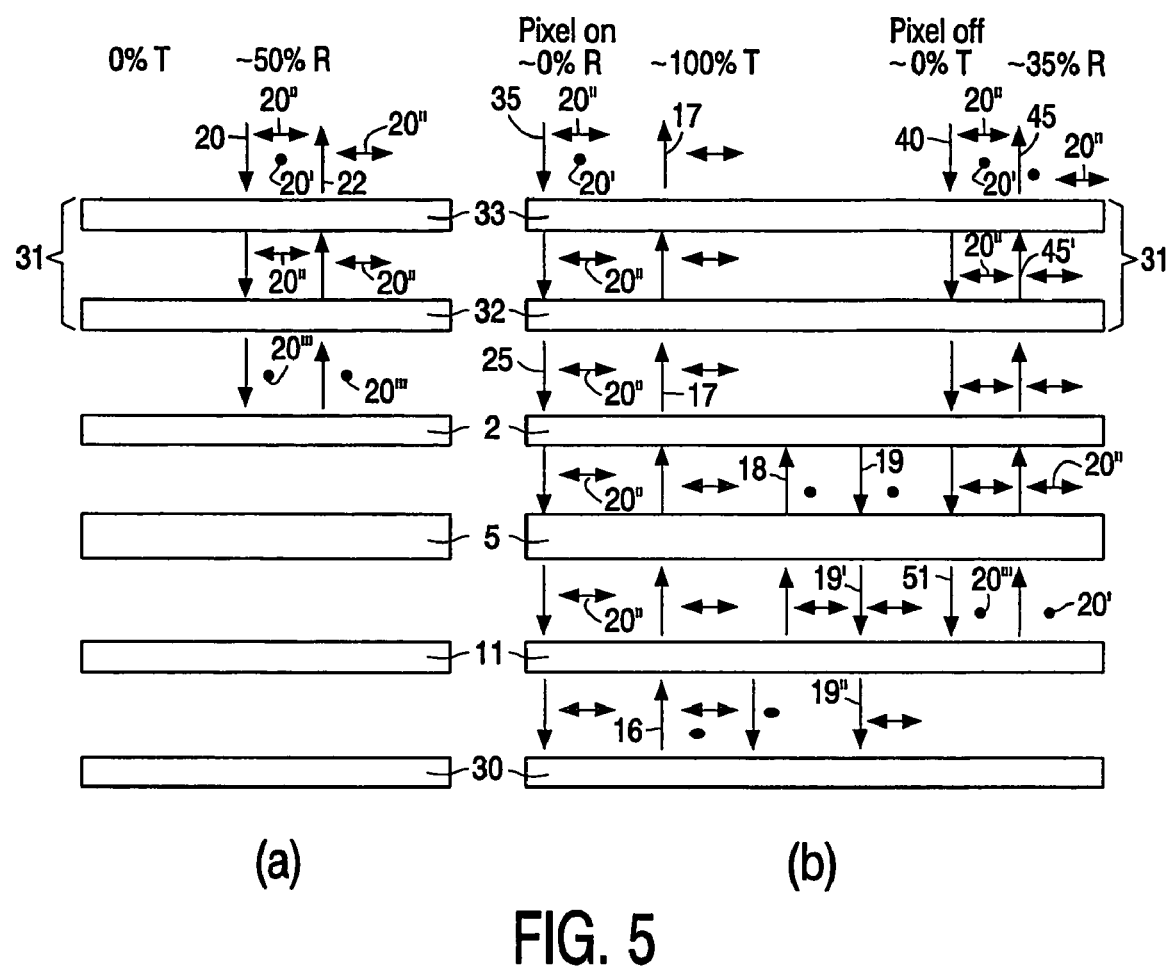
Figure 6:
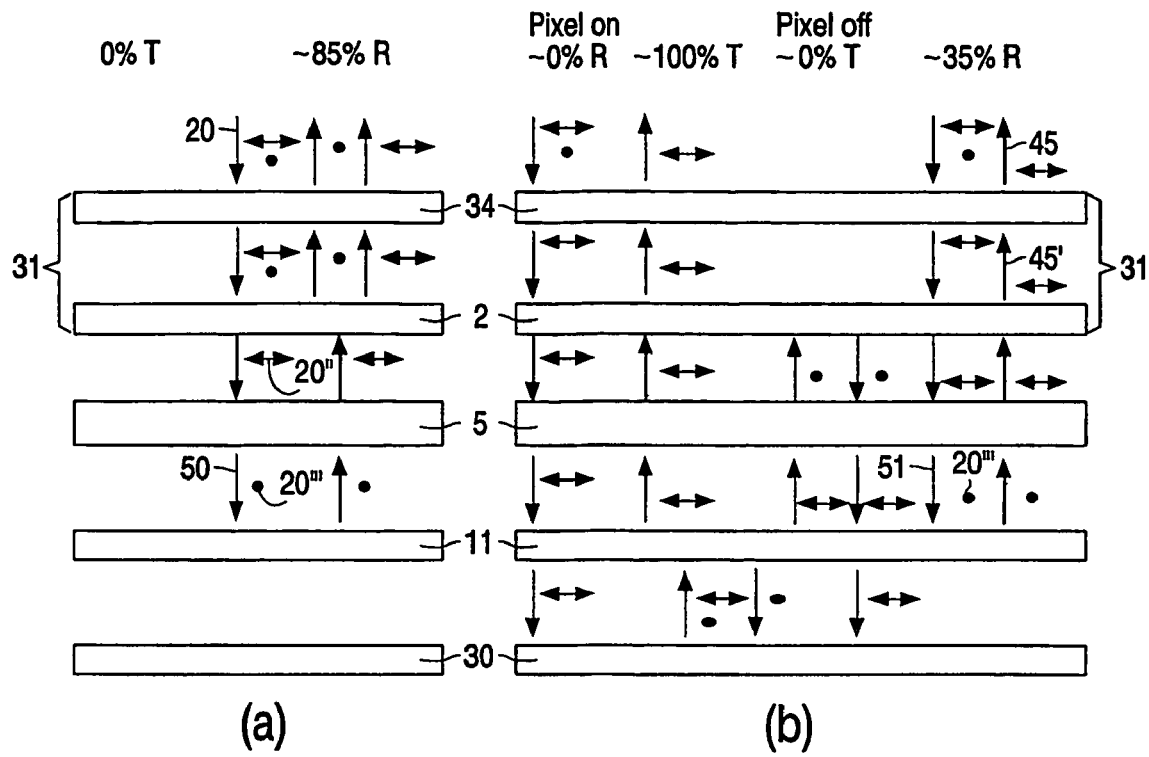
Figure 7:
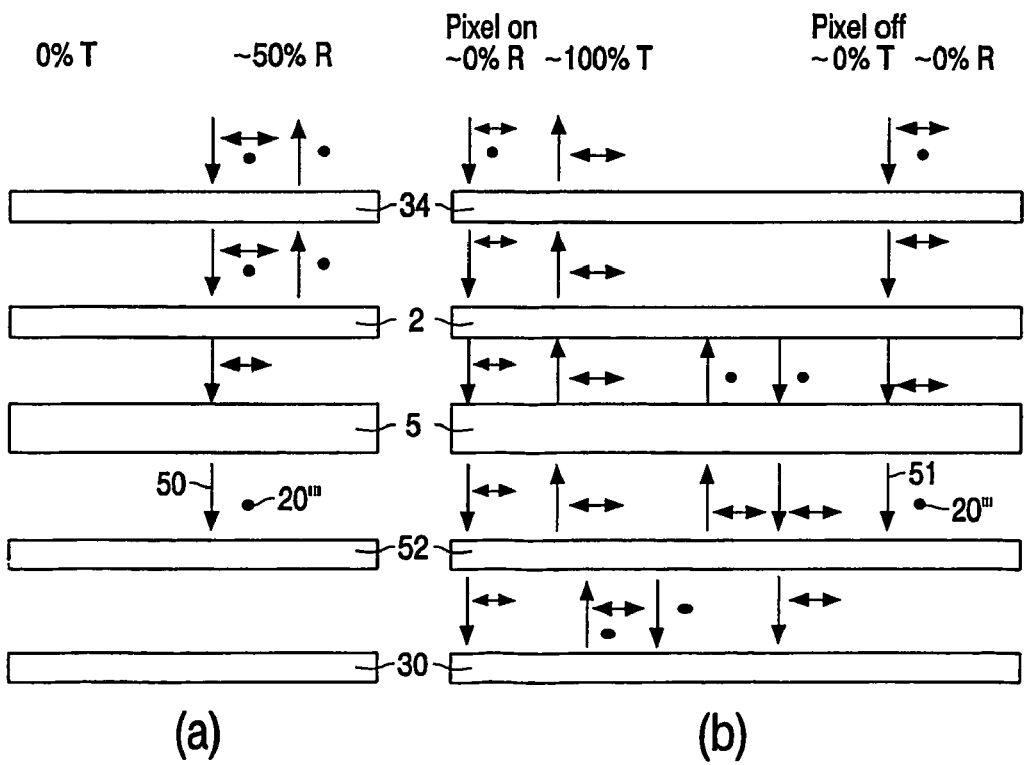

FIG. 3 is a diagrammatic cross-section of a part of a mirror device according to the invention, FIG. 4 is a diagrammatic cross-section of a part of another mirror device according to the invention, while FIGS. 5 and 6 show diagrammatic cross-sections of further devices according to the invention and FIG. 7 is a diagrammatic cross-section of a part of another mirror device according to the invention.

The Figures are diagrammatic and not drawn to scale. Corresponding elements are generally denoted by the same reference numerals.

FIG. 1 shows a mirror device 1 for viewing purposes having on a glass plate or any other substrate 4 a mirror 2 reflecting light, so a person 3 sees his image 3' (and further background, not shown). According to the invention the mirror (plane) only reflects light of a first kind of polarization (direction), but passes light of a second kind of polarization (direction). Furthermore the mirror is provided with a display device 5 at its non-viewing side (see also FIG. 2).

The display device 5 in this example is a liquid crystal display device having between two substrates (glass or plastic or any other suitable material) a liquid crystal material 6. Since most liquid crystal display devices are based on polarization effects the display 5 during use substantially emits polarized light. In general light from a backlight 10 is modulated by the liquid crystal display effect. Since the liquid crystal display device is based on a polarization effect the display 5 comprises a first polarizer 8 and a second polarizer (or analyzer) 9, which passes light of a certain polarization (direction).

This light of a certain polarization has the same (linear) polarization direction as the second kind of polarization (direction), so it passes the mirror (plane) 2 without any loss of light (100% transmission).

Since most liquid crystal display devices are based on modulation of linearly polarized light, linear polarizers 8, 9 are used, and the mirror 2 also is a linear polarization selective mirror e.g. a stack of dielectric layers, each layer having an optical thickness of one-quarter of a selected wavelength (or a mean value for a spectrum), while the layers have selected refractive indices. Another possibility is the use of so-called wire grid polarizer (a grid of thin conducting wires) that is transmissive for one polarization and reflective for the orthogonal polarization.

If the mirror and the display device are rotatable with respect to each other with respect to an axis substantially perpendicular to the first plane the transmission factor for the polarized light emitted by the display is variable, since it depends on the angle between the polarization (direction) of the modulated light and the polarization axis of the light which passes the mirror 2. In this way images from the display can be dimmed or completely turned off, if wanted, by simply rotating the mirror.

On the other hand in certain applications it may even be attractive to polarize light from e.g. an (O)LED or other display to obtain the effect of a high contrast of displayed information with respect to reflected images in mirror applications.

FIG. 3 shows a part of a mirror according to the invention in which a liquid crystal display device 5 is used, comprising at the non-viewing side a further polarizing mirror 11 between the display device 5 and the backlight 10.

Incident light 20 reflects partly (one polarization direction, in this example indicated as (a point) 20') on the mirror 2 (arrow 21). If the display device 5, in this example a liquid crystal display, is "off" (FIG. 3*a*) or "inactive" the remaining part (other polarization direction, in this example indicated as (a double arrow) 20") passes said display device 5 which acts as a switchable half-lambda plate, changes its polarization direction (indicated as a point 20''') and said remaining part is reflected on the linear polarizing mirror 11. After reflection the reflected light having polarization direction 20''' passes the display device 5 (changing its polarization direction again (indicated as double arrow 20") and passes the linear polarization selective mirror 2 again (arrow 22). To act as a switchable half-lambda plate a twisted nematic liquid crystal display device between perpendicular polarizers is chosen (as an example). Other possibilities are devices based on electrically controlled/compensated birefringence (ECB, OCB), a ferro-electric effect or in-plane switching (IPS).

As a result, substantially all incident light in principle is reflected. In practice however light loss occurs especially in color displays since transmission of the polarized light through the color filter is about 25%, so about 10-15% of the remaining part (the other polarization direction indicated as 20") is finally reflected resulting in about 60-65% total reflection (the combined reflection of arrows 22, 22'). This 60-65% total reflection does not take into account further light losses in the display or intermediate layers.

In the display mode the display device 5 in this example emits linearly polarized light of the second polarization direction (indicated as (a double arrow) 15"), either directly or by having the light passing a polarizer (not shown). In this situation the polarized light of polarization direction 15" is generated by the backlight 10 (arrow 16) and passes the linear polarizing mirror 11 (arrow 16') without changing its polarization direction (indicated as double arrow 15"). Light of the other polarization direction (indicated as (a point) 15') generated by the backlight 10 is reflected by the linear polarizing mirror 11, without changing its polarization direction (indicated as arrow 15', arrow 17). Depending on the type of backlight (e.g. when cholesteric mirrors are used) at least part of this reflected light is reflected in said backlight while changing its polarization direction again and light of polarization direction 15" is emitted.

The polarized light of polarization direction 15" (arrow 16') passes the display 5. If a picture element (pixel) is "on" or "active" substantially no light is absorbed and the polarization direction 15" is maintained; the light of this polarization direction 15" passes the linear polarization selective mirror 2 without substantial light loss, leading to a transmission factor of substantially 100%.

On the other hand ambient light (arrow 25) is partly reflected by the linear polarization selective mirror 2 (one polarization direction, in this example indicated as (a point) 20'). The remaining part (other polarization direction, in this example indicated as (a double arrow) 20") passes said display device 5 and now maintains its polarization direction and also passes the linear polarizing mirror 11. Part of this is lost in the color filter again, which also applies to light reflected by the backlight, leading to a negligible contribution to the reflection. So about 50% reflection is observed if a picture element (pixel) is "on" or "active".

If a picture element (pixel) is "off" (FIG. 3*b*) or "inactive" the light of polarization direction 15" (indicated as double arrow 15") passes the linear polarizing mirror 11 (arrow 16') without changing its polarization direction. After passing the display device 5 its polarization direction is rotated, indicated as (a point) 15' (arrow 18) and the polarizing mirror 2 reflects the light, without changing its polarization direction (indicated as (a point) 15', arrow 19). After reflection the light passes said display device 5 again and now rotates its polarization direction and also passes the linear polarizing mirror 11 and is (in this example) depolarized in the backlight. Ambient light (arrow 25) is partly reflected by the linear polarization selective mirror 2 and for pixels which are "off" behaves in a similar way as described with reference to FIG. 3*a*, resulting in about 60-65% total reflection.

So in both the "on" or "active" state and in the "off" or "inactive" state the maximum reflection is lower than the maximum transmission and dependent on the status of the picture element. A higher reflection is obtainable by using a color filter that reflects most part of the spectrum and only transmits a narrow spectral band. A red subpixel color filter will pass a narrow red spectral band from the backlight to the viewer and reflect the rest of the spectrum back to the backlight. Similarly this filter will reflect most of the incoming light back to the viewer, apart from a small red portion of the spectrum. This can be obtained by using a collimated backlight with narrow spectral sources (having a bandwidth of at most 20 μm) like laser diodes or LEDs. Such backlight systems have a 10°-20° angle for the out-coupled light.

As mentioned above light loss occurs especially in color displays since transmission of the polarized light through the color filter is only about 25%. Using the configuration of FIG. 4, in which the color filter 13 is provided at the backside, between the linear polarizing mirror 11 and the backlight 10, prevents this loss. Since in the mirror mode (FIG. 4*a*) transmission of the polarized light part of the other polarization direction (indicated as 20") through the display is now about 60-80%, resulting in about 85% total reflection (the combined reflection of arrows 22, 22'). The further reference numerals in FIG. 4*a* have the same meaning as those in FIG. 3*a*. A similar reasoning applies to the situation of FIG. 4*b* (display mode) in which for a picture element (pixel), which is "off", or "inactive" also about 85% total reflection is obtained.

Alternatively the backlight 10 may be a scanning backlight in which colored light is provided sequentially, either for the whole display or for parts of it. In a color-sequential display there are no color subpixels in the liquid crystal display device and hence no absorption losses. The colors are generated time sequentially switching the backlight e.g. from red to green to blue. Synchronized with the backlight the crystal display device (without color filter subpixellation) will display the red, green, and blue sub-fields time sequentially. Now the display mirror device has a high transmission of 80-85% and the use of two linear reflecting polarizers 2, 11 will increase the reflection of the whole configuration. For this configuration the backlight does not have to be collimated as the colors are generated by the backlight itself and the transmission is modulated by the LC layer. As for the previously suggested configuration the "off" state in the display mode of this configuration will also be about 85% reflective. Preferably a fast switching LC effect, like e.g. OCB or FLC, is necessary in order not to see the color breakup by the color sequential backlight.

In the embodiments described above the display mode still has 50% reflectivity for the white pixels, and for the black pixels it can even increase to 85% for the solutions as proposed in FIG. 4 (or a similar embodiment using a color-sequential or scanning backlight). To suppress this reflectivity the use of a switchable polarizer is proposed. The switchable polarizer is placed in front of the display to suppress remaining reflections from the mirror in the display mode. The switchable polarizer can be composed of a ½λ retarder and an absorbing polarizer or a guest host system. Further details about such switchable polarizers can be found in the pending European Application Serial number 02079306.3, filed on Oct. 17, 2002 (=PH NL 02.1038)

FIG. 5 shows an embodiment having such a color-sequential or scanning backlight 30 and switchable polarizer 31, being composed of a ½λ retarder (or switch) 32 and an absorbing polarizer 33. Incident light 20, in the "mirror mode" is absorbed partly (one polarization direction, in this example indicated as (a point) 20') in the absorbing polarizer 33. The remaining part (other polarization direction, in this example indicated as (a double arrow) 20") passes said absorbing polarizer 33. A switchable half-lambda plate 32, changes its polarization direction (indicated as a point 20''') and said remaining part is reflected on the linear polarizing mirror 2. After reflection the reflected light having polarization direction 20''' passes the ½λ retarder (or switch) 32, which (being in a state changing polarization direction) switches said polarization direction, indicated as (a double arrow) 20") and passes the absorbing polarizer 33 (arrow 22). By this measure only 50% of incident light 20 is reflected in the "mirror mode".

In the display mode however the reflection in the "off" pixels is suppressed to about 35%, and for the "on" pixels to 0%. Incident light 25, for "on" pixels in the "display mode" is absorbed partly (one polarization direction, in this example indicated as (a point) 20') in the absorbing polarizer 33. The remaining part (other polarization direction, in this example indicated as (a double arrow) 20") passes the ½λ retarder, which is now switched to a state in which the polarization is maintained, since the polarization is also maintained in the linear polarizing mirror 2, the display device 5 and the linear polarization selective mirror 11 again, leading to a reflection of substantially zero.

Incident light 40, for "off" pixels in the "display mode" (FIG. 5b) is absorbed partly (one polarization direction, in this example indicated as (a point) 20') in the absorbing polarizer 33. The remaining part (other polarization direction, in this example indicated as (a double arrow) 20") passes the ½λ retarder, which is now switched to a state in which the polarization is maintained, since the polarization is also maintained in the linear polarizing mirror 2, but in the liquid crystal display device 5 it changes its polarization direction (indicated as a point 20''') and said remaining part is reflected on the linear polarizing mirror 11 and after reflecting at said linear polarization selective mirror 11 (see arrow 45'), maintaining its polarization direction (indicated as a point 20''') The polarization is changed in the display device again, passes the ½λ retarder (or switch) 32 (see arrow 45') and the absorbing polarizer 33 without further change of polarization so the final reflection is about 35% (arrow 45). The extra switchable polarizer 31 does not influence transmission of the display so for the display mode the contrast is improved.

FIG. 6 shows the display mirror as proposed in FIG. 5 using a switchable polarizer 31, being composed of a guest host polarizer 34 and an absorbing polarizer 33 to suppress the reflection in the display mode. The guest-host polarizer can be switched between a transparent state and a stat absorbing one polarization direction. For this configuration, since no absorption takes place in the guest host polarizer 34 the improvement in reflectivity of the embodiment of FIG. 4 is preserved (about 85%) as can be seen in the FIG. 6a In the "display mode" (FIG. 6b) the device behaves substantially similar as the device of FIG. 5b. The further reference numerals have the same meaning as those in FIGS. 3, 4, 5.

In the embodiment of FIG. 7 the final reflection of about 35% (arrow 45) which is observed for the "off" pixels in the display mode are prevented by adding an absorbing polarizer 52 between the color-sequential or scanning backlight 30 and the liquid crystal display device 5. On the one hand this improves the black state for all inventive embodiments and consequently the contrast of the mirror mode, since the reflection is zero now. Although the reflective polarizer (linear polarizing mirror) 11 may be dispensed with now the reflectivity in the mirror mode is reduced to about 50%.

In the different embodiments the components used as reflective polarizers are may be cholesteric filters or birefringent foils which can be attached directly to the outside of the display and function as a polarizer and reflector in one. This means that the absorbing polarizers normally attached to an LCD are not needed. A wire grid polarizer is another example of a reflective polarizer. Such a polarizer consists of a substrate (glass or else) with thin metal wires. It can be used instead of the normal substrates used for LCDs if the wire grid is used as electrode or if the electrode structure is deposited on top of the wire grid structure.

Also if a polarized light backlight is used the light not transmitted through the linear polarizing mirror can be recycled and consequently the output of the display can be enhanced. The backlight can be integrated with the linear polarizing mirror and serve as a substrate for the display mirror.

The shown configurations are not restricted to ½λ retarders and/or absorbing polarizers and switchable guest host cells. These components are based on LC effects, in the shown solutions twisted nematic for the ½λ retarder and untwisted nematic for the guest host cell. In principle any combination of an LC effect (twisted nematic, untwisted nematic, planar or vertically aligned, in plane switching) can be used if the component properties are matched to the display and mirror requirements.

The protective scope of the invention is not limited to the embodiments described. For instance, since the mirror 2 has a polarizing effect the second polarizer (or analyzer) 9 in FIG. 2 may be deleted, if wanted.

Although a backlit transmissive liquid crystal display device has been described, the use of reflective liquid crystal display devices is not excluded.

On the other hand as shown light from e.g. an (O)LED may be polarized or it may even be attractive to use other display effects to obtain the effect of a high contrast of displayed information with respect to reflected images in mirror applications.

Also, as mentioned in the introduction, more than one display can be integrated in the mirror, whereas many other applications areas can be thought of (rear view mirrors, fitting rooms, etcetera). In some applications, if a matrix form is used, with adequate driving circuitry the switching between mirror-state and display state can be done locally.

The invention resides in each and every novel characteristic feature and each and every combination of characteristic features. Reference numerals in the claims do not limit their protective scope. Use of the verb "to comprise" and its conjugations does not exclude the presence of elements other than those stated in the claims. Use of the article "a" or "an" preceding an element does not exclude the presence of a plurality of such elements.

The invention claimed is:

1. A polarizing mirror for viewing purposes having:
   A first plane reflecting light of a first kind of polarization to a viewing side, the mirror passing light of a second kind of polarization and being provided with a display device at its non-viewing side, the display device having a liquid crystal material between two substrates and being next to the first plane,
   wherein the display device during use provides light of the second kind of polarization, the mirror display device having at the non viewing side a further polarizing mirror and color generating means, wherein the further polarizing mirror is positioned directly between an electro-optical layer of the display device and the color generating means including a backlight without any pre-filters therebetween, wherein said polarizing mirror and said display device are rotatable with respect to each other and with respect to an axis substantially perpendicular to the first plane.

2. The polarizing mirror as claimed in claim 1, the color generating means comprising a color sequential backlight.

3. The polarizing mirror as claimed in claim 1, the color generating means comprising a backlight emitting narrow bands of light.

4. The polarizing mirror as claimed in claim 3, the emitting bands of light having a bandwidth of at most 20 nm.

5. The polarizing mirror as claimed in claim 1, the polarizing mirror at its viewing side having switchable polarizing means being switchable between two optical states.

6. The polarizing mirror as claimed in claim 5 in which the switchable polarizing means at its viewing side comprises between two substrates a liquid crystal layer comprising a dye.

7. The polarizing mirror as claimed in claim 5 in which the switchable polarizing means at its viewing side comprises a ½λ retarder and a polarizer.

8. A polarizing mirror for reflecting light of a first kind of polarization to a viewing side, and passing light of a second kind of polarization, the polarizing mirror comprising:
   a display device at a non-viewing side of the polarizing mirror, the display device having a liquid crystal material between two substrates and being next to the viewing side, wherein the display device during use provides light of the second kind of polarization;
   a further polarizing mirror; and
   a backlight at the non-viewing side, wherein the further polarizing mirror is positioned directly between an electro-optical layer the display device and the backlight without any pre-filters therebetween, wherein said polarizing mirror and said display device are rotatable with respect to each other and with respect to an axis substantially perpendicular to the first plane.

9. The polarizing mirror of claim 8, wherein the backlight comprises a color sequential backlight.

10. The polarizing mirror of claim 8, wherein the backlight is configured to emit narrow bands of light.

11. The polarizing mirror of claim 10, wherein the narrow bands of light have a bandwidth of at most 20 nm.

12. The polarizing mirror of claim 8, further comprising a switch for on the viewing side switching the polarizing mirror between two optical states.

13. The polarizing mirror of claim 12, wherein the switch comprises a dye between two substrates a liquid crystal layer.

14. The polarizing mirror of claim 12, wherein the switch comprises a ½λ.

* * * * *